United States Patent
Yang et al.

(10) Patent No.: US 7,819,648 B2
(45) Date of Patent: Oct. 26, 2010

(54) OUTER FRAME FOR CUBIC HINGE PRESS AND THE CUBIC HINGE PRESS WITH THIS OUTER FRAME

(75) Inventors: Jinzhong Yang, Henan (CN); Liuxi Guo, Henan (CN); Qingguo Zhao, Henan (CN)

(73) Assignee: Zhengzhou Synthetic Diamond and Related Products Engineering Technology Research Center, Henan (CN)

( * ) Notice: Subject to any disclaimer, the term of this patent is extended or adjusted under 35 U.S.C. 154(b) by 0 days.

(21) Appl. No.: 11/916,986

(22) PCT Filed: Apr. 13, 2007

(86) PCT No.: PCT/CN2007/001207
§ 371 (c)(1),
(2), (4) Date: Dec. 19, 2008

(87) PCT Pub. No.: WO2007/140690
PCT Pub. Date: Dec. 13, 2007

(65) Prior Publication Data
US 2009/0136607 A1 May 28, 2009

(30) Foreign Application Priority Data
Jun. 5, 2006 (CN) .................. 2006 1 0017893

(51) Int. Cl.
*B28B 3/00* (2006.01)
(52) U.S. Cl. ............ 425/77; 425/405.2; 100/232
(58) Field of Classification Search .............. 425/77, 425/78, 405.2; 100/232, 269.01
See application file for complete search history.

(56) References Cited

U.S. PATENT DOCUMENTS

| 3,093,863 | A | * | 6/1963 | Ehlert | 425/451.2 |
| 3,914,078 | A | * | 10/1975 | Kendall | 425/77 |
| 4,302,168 | A | * | 11/1981 | Khvostantsev | 425/77 |
| 5,744,170 | A | * | 4/1998 | Hall | 425/77 |
| 6,336,802 | B1 | | 1/2002 | Hall | |

FOREIGN PATENT DOCUMENTS

CN          2291198 Y       9/1998

* cited by examiner

*Primary Examiner*—Richard Crispino
*Assistant Examiner*—Thu Khanh T Nguyen
(74) *Attorney, Agent, or Firm*—Ladas & Parry, LLP

(57) ABSTRACT

The present invention provides an outer frame for cubic hinge press and the cubic hinge press with this outer frame, said outer frame encloses an accommodation space; The supporting planes used for supporting and fixing the back cover plates of hinge sleeve cylinder are set around the inner walls of the outer frame and on the inner walls of upper and lower surfaces of outer frame; A window for the assembly, disassembly and maintenance of press is correspondingly set between two adjacent supporting planes on the outer frame. According to different needs, the outer frame may be designed as square frame, butterfly frame, basket type frame or spherical frame. The hinge press formed by connecting six hinge sleeve piston components through reinforcing plate or through hinge ears and pins is installed in the accommodation space enclosed by the outer frame, thus forming a cubic hinge press. The outer frame for cubic hinge press provided by present invention has simple structure, which is convenient for assembly, disassembly and maintenance of press. The cubic hinge press with said outer frame provided by present invention is featured by small equipment investment and high precision of press.

8 Claims, 6 Drawing Sheets

OUTER FRAME FOR CUBIC HINGE PRESS AND THE CUBIC HINGE PRESS WITH THIS OUTER FRAME

FIELD OF THE INVENTION

The present invention relates to an outer frame for cubic hinge press and the cubic hinge press with this outer frame, which belong to the technical field of equipment processing for superhard material synthesis.

DESCRIPTION OF THE PRIOR ART

The cubic hinge press equipment for synthesis is a kind of special equipment for the production of diamond. FIG. 1 is the structural diagram of present cubic hinge press. As can be known from FIG. 1, the present cubic hinge press A is composed of six hinge sleeves 100, in which the position components are connected by hinge ear 101 and pin 102. In the working process of press, since the hinge sleeves 100 are subjected to the actions of radial expansion force of pressure chamber and the powerful outward back-thrust force of cylinder body, the ear part of hinge ear 101 bears great stress and may easily break in use. Meanwhile, since the parts of cubic hinge press have to bear relatively big stress, the requirements for the strength of parts are relatively high and thus involves major equipment investment; Since the fit clearance for pin connection is inevitable, it is necessary to eliminate fit clearance after bearing stress in working process, the accumulative error of press is big and there will be great changes in the spatial position degree of the central line of each position, resulting in major errors of concentricity and verticality and low press precision.

SUMMARY OF THE INVENTION

The first technical object of the present invention is to provide an outer frame for cubic hinge press aiming at overcoming the deficiency of prior art. This outer frame for cubic hinge press is featured by simple structure and thus facilitates the assembly, disassembly and maintenance of the press.

Said technical object of the present invention is achieved by means of the technical solution described as follows:

An outer frame for cubic hinge press, said outer frame encloses an accommodation space; the supporting planes used for supporting and fixing the back cover plates of hinge sleeve cylinder are set around the inner walls of outer frame and on the inner walls of upper and lower surfaces of outer frame; A window for the assembly, disassembly and maintenance of press is correspondingly set between two adjacent supporting planes on the outer frame.

According to various needs, the outer frame may be designed as multiple structural styles to meet the demand.

Said outer frame may be designed as an integral square frame.

Said outer frame may be formed by connecting the surrounding conjoined support and upper and lower butterfly supports. The surrounding conjoined support is designed as framed structure, supporting planes used for supporting and fixing the back cover plates of hinge sleeve cylinder are set on the inner walls of its surrounding frames, and hinge ears are set on the upper and lower parts around the conjoined supports. The supporting planes used for supporting and fixing the back cover plates of hinge sleeve cylinder are set on the inner walls of upper and lower butterfly supports, butterfly hinge ears are correspondingly set on the upper and lower butterfly supports and surrounding conjoined support; the surrounding conjoined support and the upper and lower butterfly supports are fixed by mutually matching hinge ears connected through pins, and a window for the assembly, disassembly and maintenance of press is formed between two adjacent connecting hinge ears.

Said outer frame may also be formed by connecting the basket type frame and the frame cover. The supporting planes used for supporting and fixing the back cover plates of hinge sleeve cylinder are set on the inner bottom surface and surrounding inner walls of basket type frame; the supporting planes used for supporting and fixing the hinge sleeve cylinder are set on the inner surface of the frame cover connected on the upside of basket frame, the corresponding hinge ears are respectively set around the opening part of basket type frame and set around the frame cover; the basket type frame and the frame are fixed by mutually matching hinge ears connected through pins, and a window for the assembly, disassembly and maintenance of press is set between two adjacent supporting planes on the outer frame.

Said outer frame may also be designed as a spherical shell, the supporting planes used for supporting and fixing the back cover plates of hinge sleeve cylinder are set around the inner walls of outer frame and the inner walls of its upper and lower parts; A window for the assembly, disassembly and maintenance of press is set between two adjacent supporting planes on the spherical shell, and a base is set at the bottom of spherical shell. For the easy of connection, an opening is set at the bottom of spherical shell; the base is embedded in the opening. Therefore, the base is set corresponding to the opening, with its section representing inversed T-type; the upper inner surface of base is the supporting plane adapted to the back cover plate of hinge sleeve cylinder.

Said pins used for connecting the surrounding conjoined support and the upper and lower butterfly supports as well as the pins used for connecting the basket type frames and frame covers are radial movement positioning pins, which are mainly composed of halves type position sleeve and taper core shafts; The inner walls of the halves type position sleeve present taper form, and its outer walls present cylindrical shape, its end surface has radial boss, a clearance is reserved between two halves of position sleeve, a taper core shaft adapted to its inner wall is sleeved in the position sleeve, a stud section is set at the top of core shaft and is fixed in cooperation with the rotation nut.

The second technical object of the present invention is to provide a cubic hinge press with outer frame aiming at overcoming the deficiency of prior art. This cubic hinge press is featured by small equipment investment and high precision.

Said technical object of the present invention is achieved by means of the technical solution described as follows:

A cubic hinge press with outer frame composed of the outer frame and the press body which is installed in the outer frame and is formed by connecting six hinge sleeve piston components; The back cover plates of hinge sleeve cylinder are installed in the supporting planes which set around the inner walls of outer frame and on the inner walls of upper and lower surfaces of frame; A window for the assembly, disassembly and maintenance of press is correspondingly set between two adjacent supporting planes on said outer frame.

Said press includes six hinge sleeve cylinders connected through reinforcing plate; The interior convex of the front end of hinge sleeve cylinder forms the piston hole, and the back cover plate installed at its rear end forms the piston cylinder, and the piston is installed inside the piston cylinder. In addition, the six hinge sleeve cylinders in the press may also be connected through hinge ears and pins.

According to various needs, the outer frame may be designed as multiple structural styles to meet the demand.

Said outer frame may be designed as an integral square frame.

Said outer frame may be formed by connecting the surrounding conjoined support and the upper and lower butterfly supports; The surrounding conjoined support is designed as framed structure, and the supporting planes used for supporting and fixing the back cover plates of hinge sleeve cylinder are set around the inner walls of the surrounding conjoined support, and hinge ears are set on the lower and upper parts around it; The supporting planes used for supporting and fixing the back cover plates of hinge sleeve cylinder are set on the inner surfaces of the upper and lower butterfly supports, and butterfly hinge ears are on its four sides, and the surrounding conjoined support and the upper and lower butterfly supports are fixed by mutually matching hinge ears connected through pins.

Said outer frame may also be formed by connecting basket type frame and frame cover. The supporting planes used for supporting and fixing the back cover plates of hinge sleeve cylinder are set on the inner bottom surface and the surrounding four sides inner walls of basket type frame; the supporting planes used for supporting and fixing the hinge sleeve cylinder are set on the inner surface of the frame cover connected on the upside of basket frame, the corresponding hinge ears are respectively set around the opening part of basket type frame and set around the frame cover; the basket type frame and the frame are fixed by mutually matching hinge ears connected through pins, and a window for the assemble, disassemble and maintenance of press is set between two adjacent supporting planes on the outer frame.

Said outer frame may also be designed as a spherical shell, the supporting planes used for supporting and fixing the back cover plates of hinge sleeve cylinder are set around the inner walls of spherical shell and on the inner walls of the upper and lower parts of spherical shell; A window for the assembly, disassembly and maintenance of press is set between two adjacent supporting planes on the spherical shell, and a base is set at the bottom of spherical shell. For the easy in connection, an opening is set at the bottom of spherical shell, and the base is embedded in this opening. Therefore, the base is set corresponding to the opening, with its section presenting inversed T-type. The upper inner surface of base is the supporting plane adapted to said back cover plate.

Said pins are radial movement positioning pins, which are mainly composed of halves type position sleeves and taper core shafts. The inner wall of a halves type position sleeve present taper form, and its outer wall presents cylindrical form; its end surface has radial boss, a clearance is reserved between two halves of position sleeve, a taper core shaft adapted to its inner wall is sleeved in the position sleeve, a stud section is set at the top of core shaft and is fixed in cooperation with the rotation nut.

To reduce the weight of press body, said pistons are barrel type hollow pistons.

In various preferred embodiments of present invention, no matter what kind of structural styles are adopted for the design of the frame, the windows for assembly, disassembly and maintenance that are symmetrically set on the frame are convenient for the assembly, disassembly and maintenance of press body; In the process of using the press, the axial recoil force of high pressure piston is transferred to the outer frame through the back cover plates; In the working process under high pressure, the hinge sleeves mainly bear the action of radial expansion force, and the concentricity and verticality of various parts are basically free from influence, representing high precision of press; In the process of using the press, the stresses on various positions of hinge sleeves are relatively small, so that the requirement for the strength of hinge sleeve is reduced, the weight of press body is greatly decreased, the requirement for the strength of materials is also lowered, and thus the manufacturing cost of equipment is reduced.

When the outer frame of press is designed in spherical structure, it is featured by good mechanical properties, high strength, small distortion and sound stability of outer frame. In the inner walls of outer frame, except that the parts contacting the back cover plates of hinge sleeve cylinder are designed as planes, the other inner walls are designed in arc. The bottom of outer frame is designed with a base, which is in favor of the stable placement of press body. The base and the spherical shell may be processed in integrated manner or separated manner. When the outer frame of press is designed in butterfly structure or basket type structure, the outer frame is composed of three parts (namely, the upper, middle and lower parts) or of two parts (namely the upper and lower parts). Various parts are connected through pins, which is convenient for the disassembly, assembly and transportation of frame.

In addition, radial movement positioning pins may be adopted as the connection pins for six hinge sleeves. The position sleeve may be processed as an integral. After completion of processing, the position sleeve is cut into halves, with cutting groove being 3-5 mm; The radial boss for restricting axial displacement is set on the end surface of position sleeve; The excircle size of the position sleeve matches the hole clearance between the hinge sleeve and connecting part, and the taper bore matches the core shaft, with both having the same degree of taper. In the assembly process, the stud section at the top of core shaft matches with the rotation nut. Pull the core shaft to have axial movement by rotating the nut and drive the position sleeve to have radial movement by means of tapered face. The position sleeve tightly matches the connector holes of various hinge sleeves and thus plays the role of positioning. Merely loosening the rotation nut can easily disassemble the press. The present invention may achieve convenient disassembly and assembly without impact and damage; Barrel type hollow pistons may be adopted for this press, so that the weight of press body is greatly reduced.

The technical solutions of present invention will be further described in detail in combination with the attached drawings and specific embodiments.

DETAILED DESCRIPTION OF THE PREFERRED EMBODIMENTS

Embodiment 1

Figure 1:
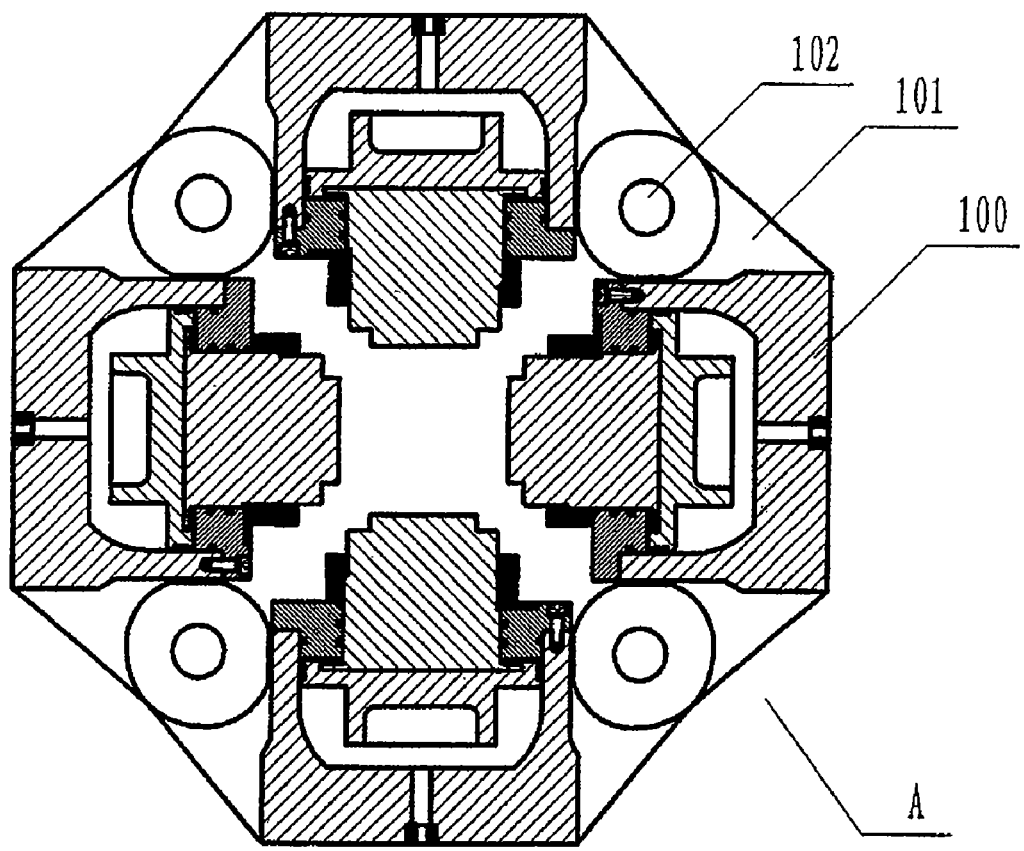
FIG. 1 is the structural diagram of the cubic hinge press of present invention.
Figure 2:
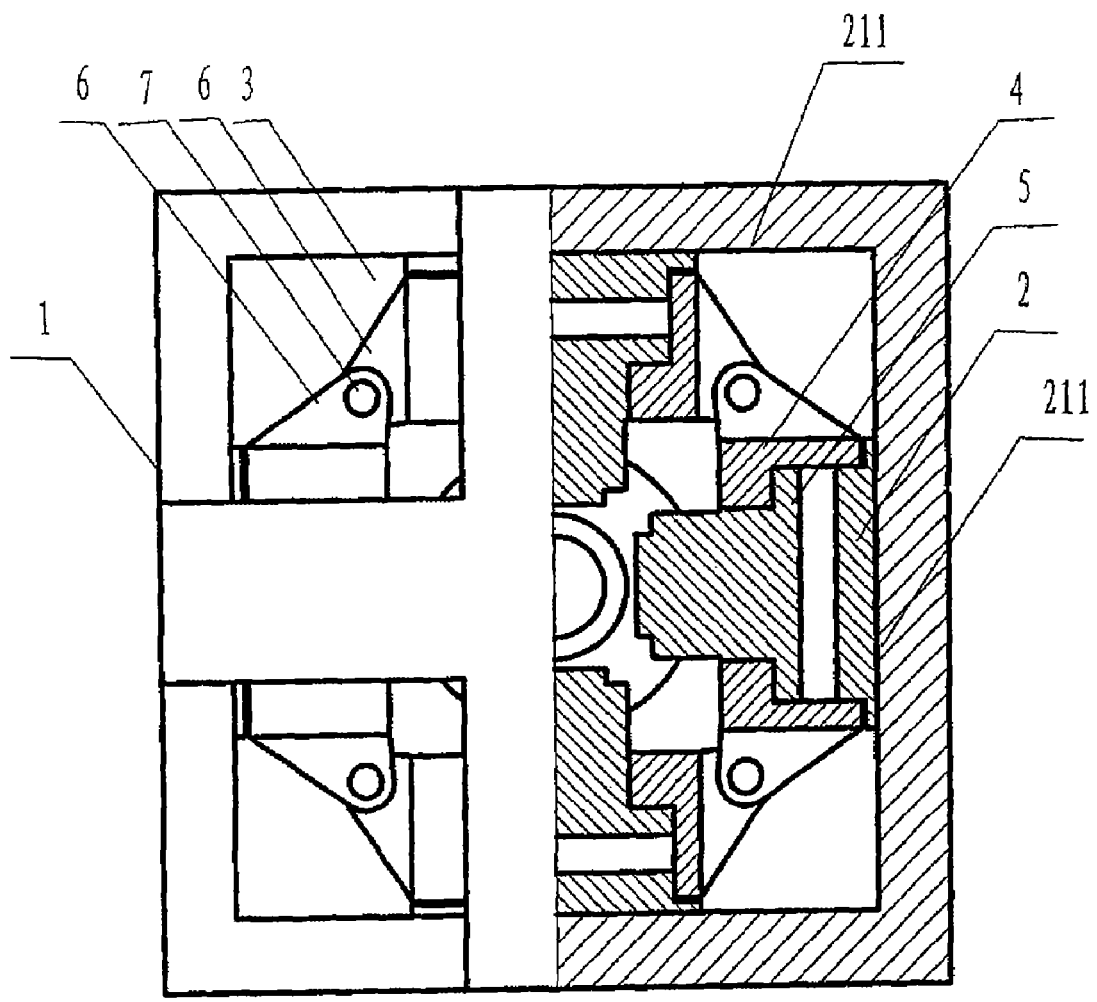
FIG. 2 is the structural diagram of the embodiment 1 of present invention.

FIG. 2 is the structural diagram of the embodiment 1 of present invention; As can be known from FIG. 2, in this embodiment, the provided outer frame is a square frame 1. This square frame 1 encloses an accommodation space; the supporting planes 211 used for supporting and fixing the back cover plates of hinge sleeve cylinder are set around the inner walls of the square frame 1 and on the inner walls of its upper and lower surfaces; A window 3 for the assembly, disassembly and maintenance of press is set at the vertex angle and base angle positions of the square frame 1.

As shown in FIG. 2, the machine installed in the accommodation space enclosed by the square frame 1 is the press formed by connecting six hinge sleeve piston components, which include six hinge sleeve cylinders 4 connected through hinge ears 6 and pins 8. The high-pressure chamber oil port and front chamber oil port (Not shown in the Figure) are set on the hinge sleeve cylinder 4. The interior convex of the front end of hinge sleeve cylinder 4 forms the piston hole, and the back cover plate 2 installed at its rear end forms the piston cylinder, and the piston 5 is installed inside the piston cylinder.

Figure 3:
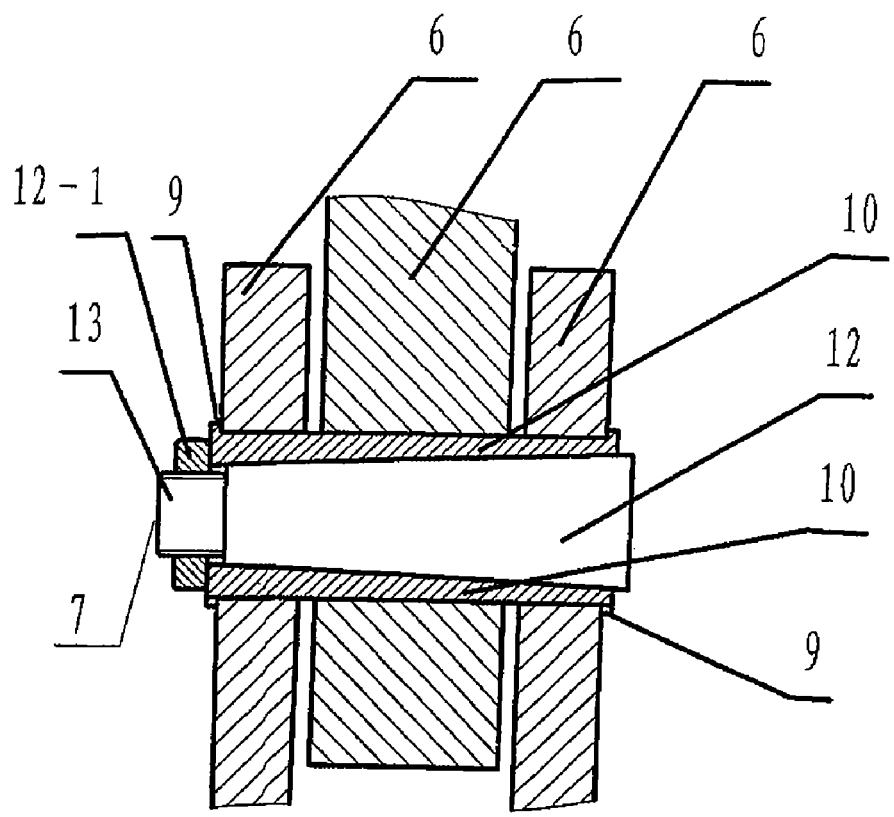
FIG. 3 is the diagram of the matching relation between the radial movement positioning pins and the hinge ears and adjusting nuts of hinge sleeve of present invention.
Figure 4:
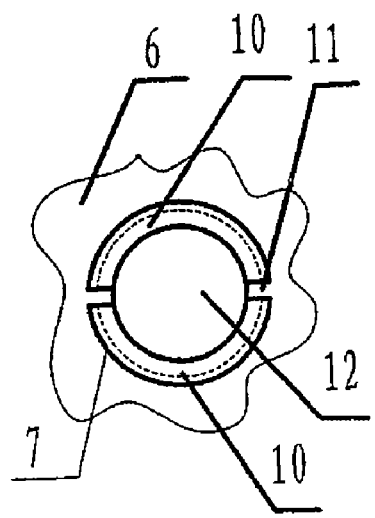
FIG. 4 is the diagram of the matching relation between the radial movement positioning pins and the hinge ears of hinge sleeves of present invention.

FIG. 3 is the diagram of the matching relation between the radial movement positioning pins and the hinge ears and adjusting nuts of hinge sleeve of present invention, and FIG. 4 is the diagram of the matching relation between the radial movement positioning pins and the hinge ears of hinge sleeves of present invention. As can be known from FIG. 2, FIG. 3 and FIG. 4, the pin 7 is radial movement positioning pin, which includes inner wall in tapered form and outer wall in cylindrical form. The end surface of pin 7 has halves type position sleeve 10 of radial boss 9, a clearance 11 is reserved between halves of position sleeve 10; A taper core shaft 12 adapted to its inner wall is sleeved in the position sleeve 10, and a stud section 13 is set at the top of core shaft 12. The rotation nut 12-1 is connected on the stud section 13 of core shaft 12 using bolt. The position sleeve 10 may be processed as an integral. After completion of processing, the position sleeve is cut into halves, with cutting groove being 3-5 mm; The boss 9 for restricting axial displacement is set on the end surface of position sleeve; The excircle size of the position sleeve matches the hole clearance between the hinge sleeve and connecting part, and the taper bore matches the core shaft 12, with both having the same degree of taper.

When adopting the pin 7 to connect and fix the hinge ears 6, it is necessary to firstly thread the pin 7 through the pin hole on the hinge ears 6 and adopt the bosses 9 on both ends of the halves type position sleeve 10 on the pin 7 to position the hinge ears 6. Then, it is necessary to sleeve the nut 12-1 on the stud section 13 of core shaft 12. The installation is completed when the nut is screwed and fixed. In the assembly process, the stud section 13 at the top of core shaft 12 matches the nut 12-1. Pull the core shaft to have axial movement by rotating the nut 12-1 and drive the position sleeve to have radial movement by means of tapered face. The position sleeve tightly matches the connector holes of various hinge sleeves and thus plays the role of positioning. Merely loosening the nut can disassemble the press. Said structure provided by the present invention may achieve convenient disassembly and assembly without impact and damage.

As shown in FIG. 2, in the working process of cubic hinge press, the pistons located on six surfaces conduct telescopic motion at the same time and provide processing treatment for the processed objects placed in its central position. In the process of using the press, the axial recoil force of high pressure piston is transferred to the square frame 1 through the back cover plates 2; In the working process under high pressure, the hinge sleeve cylinder 4 mainly bear the action of radial expansion force, and the concentricity and verticality of various parts are basically free from influence, representing high precision of press; In the process of using the press, the stresses on various positions of hinge sleeve cylinder 4 are relatively small, so that the requirement for the strength of hinge sleeve cylinder 4 is reduced, the weight of press body is greatly decreased, the requirement for the strength of materials is also lowered, and thus the manufacturing cost of equipment is reduced.

Embodiment 2

Figure 5:
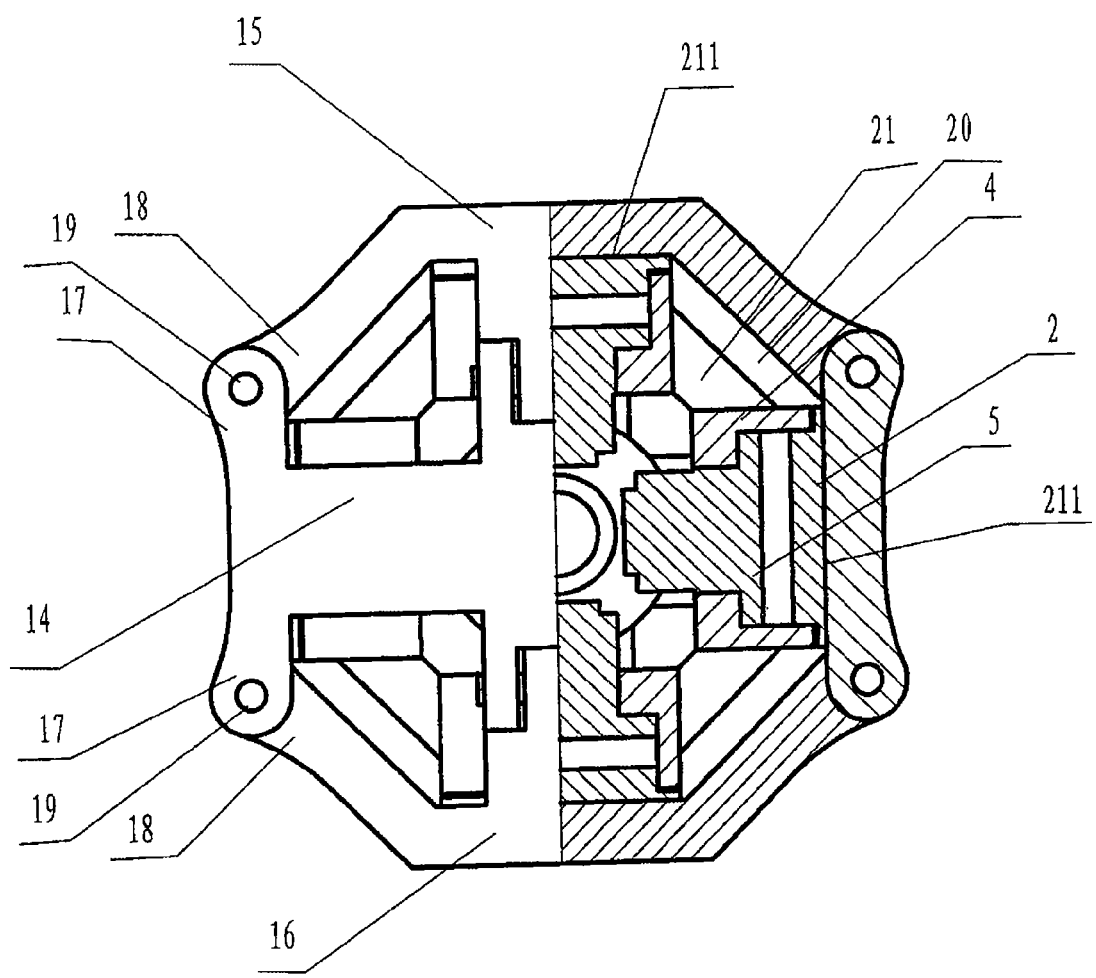
FIG. 5 is the structural diagram of the embodiment 2 of present invention.

FIG. 5 is the structural diagram of the embodiment 2 of present invention; As can be known from FIG. 5, the present invention provides an outer frame for cubic hinge press, which is formed by connecting the surrounding conjoined support 14 and upper and lower butterfly supports 15 and 16. The surrounding conjoined support 14 are designed into framed structure, the supporting planes 211 used for supporting and fixing the back cover plates 2 of hinge sleeve cylinder are set around the inner walls of the framed structure, and hinge ears 17 are set on its surrounding upper and lower parts; The supporting planes used for supporting and fixing the back cover plates 2 of hinge sleeve cylinder are set at the bottoms inner walls of the upper and lower butterfly supports 15 and 16, and butterfly hinge ears 18 are on its four sides, and the surrounding conjoined support 14 and the upper and lower supports 15 and 16 are connected and fixed through the hinge ears 17 and 18 and pins 19. A window 20 for assembly and disassembly is set between adjacent hinge ears on the upper and lower butterfly supports 15 and 16 and on the surrounding conjoined support 14. In this embodiment, the outer frame for cubic hinge press is designed in butterfly structure, which is composed of three parts (namely, the upper, middle and lower parts). Various parts are connected through pins, which is convenient for the disassembly, assembly and transportation of frame.

The present invention may be used in cooperation with the cubic hinge press with external mounted piston. The cubic hinge press with external mounted pistons includes six hinge sleeve cylinders 4 connected through reinforcing plates 21; The high-pressure chamber oil port and front chamber oil port (Not shown in the Figure) are set on the hinge sleeve cylinder 4. The interior convex of the front end of hinge sleeve cylinder 4 forms the piston hole, and the back cover plate 2 installed at its rear end forms the piston cylinder, and the piston 5 is installed inside the piston cylinder.

In this embodiment, the structure characteristic as well as the fixing and installation process of the pin 19 for connecting the surrounding conjoined support 14 and the upper and lower butterfly supports 15 and 16 are basically identical to those of the pin 7 in embodiment 1, except that there will be changes in the specific radial dimensions and lengths of its components according to the needs in practical use process, which may be selected according to installation conditions. The connected hinge ears 6 in the embodiment 1 are merely replaced as the hinge ears 17 on the surrounding conjoined support 14 and the hinge ears 18 on the lower and upper butterfly supports 15 and 16. For the detailed contents of pin 19, it is advisable to refer to the contents of relevant part in Embodiment 1, and no unnecessary detail will be given herein.

Embodiment 3

Figure 6:
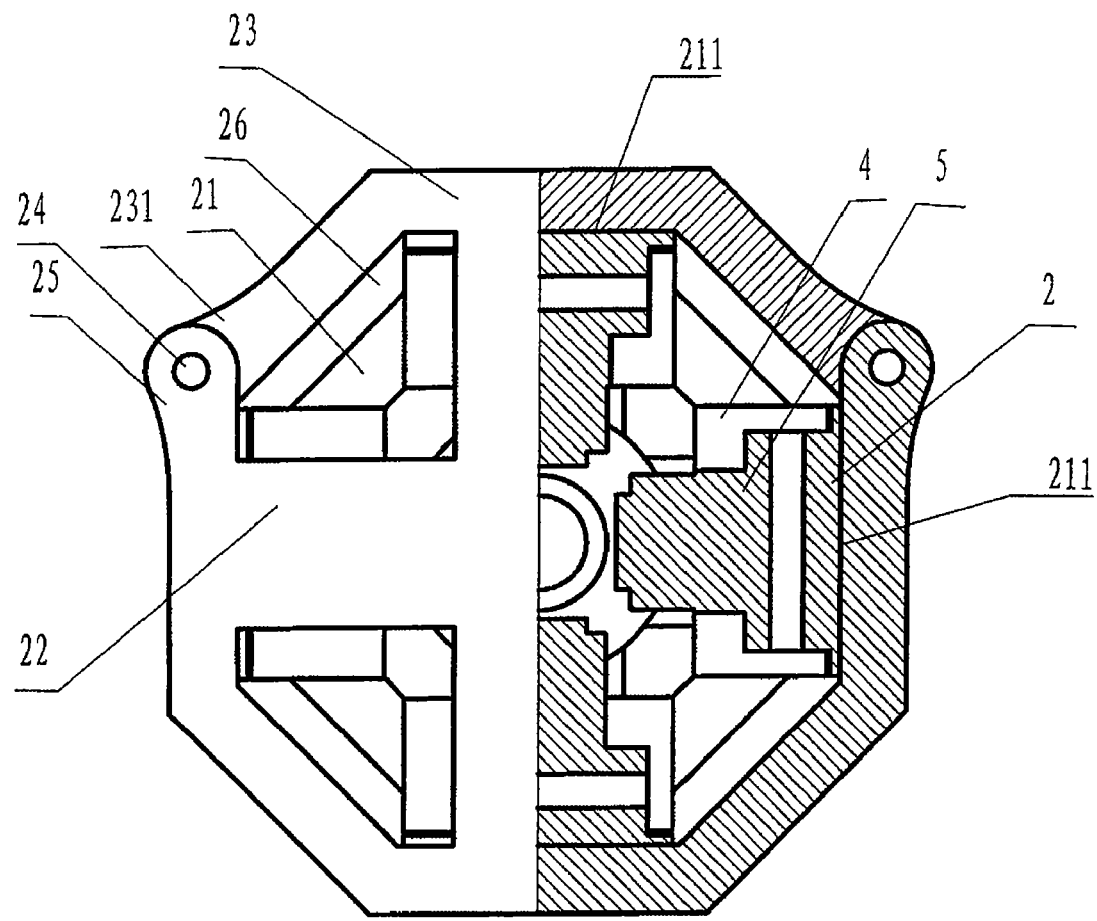
FIG. 6 is the structural diagram of the embodiment 3 of present invention.

FIG. 6 is the structural diagram of the embodiment 3 of present invention; As can be known from FIG. 6, the present invention provides an outer frame for cubic hinge press. This outer frame is a basket type frame 22, the supporting planes 211 for supporting and fixing the back cover plates 2 of hinge sleeve cylinder are set on its bottom inner surface and on its inner surrounding four sides, and the upper part of the basket type frame 22 is connected with the frame cover 23. The supporting planes 211 used for supporting and fixing the back cover plates 2 of hinge sleeve cylinder are set on the top inner surface of the frame cover 23, the mutually matching hinge ears 25 and 231 connected through pin 24 are set around the opening part of frame 22 and set around the frame cover 23. The windows 26 for assembly and disassembly are symmetrically set on the frame 22 and on the frame cover 23. In this embodiment, the outer frame for cubic hinge press is designed in basket type structure, which is composed of two parts (namely, the upper and lower parts). Various parts are connected through pins, which is convenient for the disassembly, assembly and transportation of frame.

The present invention may be used in cooperation with the cubic hinge press with external mounted piston. The structure of this press is identical to that of embodiment 2. The cubic hinge press with external mounted pistons includes six hinge sleeve cylinders 4 connected through reinforcing plates 21; The high-pressure chamber oil port and front chamber oil port are set on the hinge sleeve cylinder 4. The interior convex of the front end of hinge sleeve cylinder 4 forms the piston hole, and the back cover plate 2 installed at its outer end forms the piston cylinder, and the piston 5 is installed inside the piston cylinder.

In this embodiment, the structure characteristic as well as the fixing and installation process of the pin 24 for connecting the basket type frame and the frame cover 23 above the frame are basically identical to those of pin 7 in embodiment 1, except that there will be changes in the specific radial dimensions and lengths of their components according to the needs in practical use process, which may be selected according to installation conditions. The connected hinge ears 6 in the embodiment 1 are merely replaced as the hinge ear 25 on the basket type frame 22 and the hinge ear 231 on the frame cover 23 above the frame. For the detailed contents of pin 24, it is advisable to refer to the contents of relevant part in Embodiment 1, and no unnecessary detail will be given herein.

Embodiment 4

Figure 7:
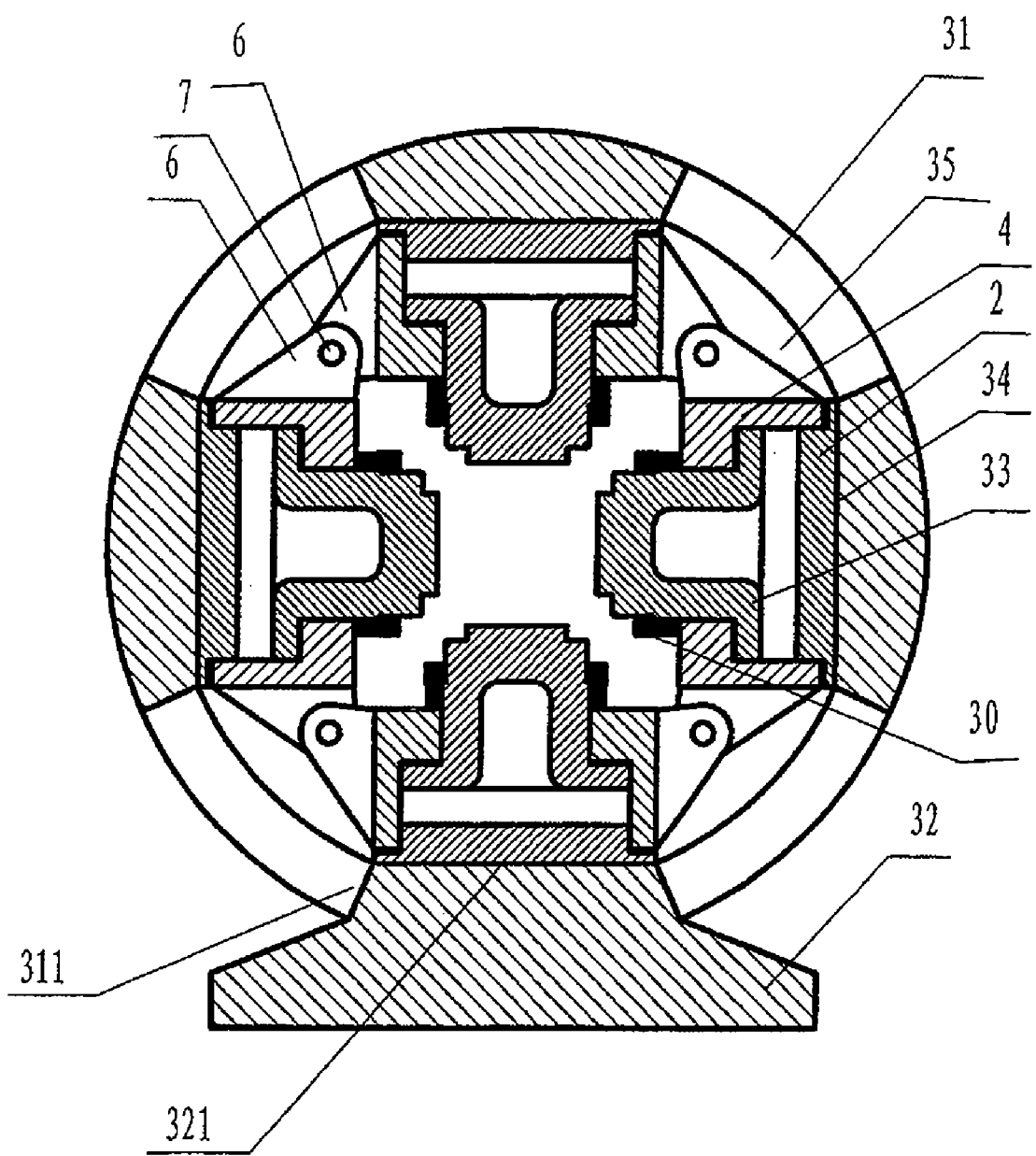
FIG. 7 is the structural diagram of the embodiment 4 of present invention.

FIG. 7 is the structural diagram of the embodiment 4 of present invention; As can be known from FIG. 7, the present invention provides a spherical outer frame for cubic hinge press, which includes the spherical shell 31 and the base 32 set at its bottom. The supporting planes 34 used for supporting and fixing the back cover plates 2 of hinge sleeve cylinder are set around the inner walls of the spherical shell 31 and the inner walls of its upper and lower parts; A window 35 for the assembly, disassembly and maintenance of press is set between two adjacent supporting planes on the spherical shell 31, and a base 32 is set at the bottom of spherical shell 31. For the easy of connection, an opening 311 is set at the bottom of spherical shell 31; the base 32 is embedded in the opening 311. Therefore, the base 32 is set corresponding to position and shape of the opening 311, with the section of base 32 representing inversed T-type; the upper surface of base 32 is the supporting plane adapted to said back cover plate of hinge sleeve cylinder.

The present embodiment may be used in cooperation with the cubic hinge press with external mounted piston. The cubic hinge press with external mounted pistons includes six hinge sleeve cylinders 4 connected through the hinge ear 6 and pin 7; The high-pressure chamber oil port and front chamber oil port (Not shown in the Figure) are set on the hinge sleeve cylinder 4. The interior convex of the front end of hinge sleeve cylinder 4 forms the piston hole, and the back cover plate 2 installed at its rear end forms the piston cylinder, and the barrel type hollow piston 33 is installed in the piston cylinder. A dustproof seal sleeve 30 fixed in the piston hole of hinge sleeve and in the periphery of piston. In this embodiment, when the outer frame is designed as spherical structure, it is featured by good mechanical properties, high strength, small distortion and sound stability of frame. In the frame, except that the parts contacting the back cover plates of hinge sleeve cylinder are designed as planes, the other inner walls are designed in arc. The bottom of frame is designed with a base, which is in favor of the stable placement of press. The base and the spherical shell may be processed in integrated manner or separated manner.

In various preferred embodiments of present invention, no matter what kind of structural styles are adopted for the design of the outer frame, the windows for assembly, disassembly and maintenance that are symmetrically set on the frame; In the process of using the press, the axial recoil force of high pressure piston is transferred to the frame through the back cover plates; In the working process under high pressure, the hinge sleeves mainly bear the action of radial expansion force, and the concentricity and verticality of various parts are basically free from influence, representing high precision of press; In the process of using the press, the stresses on various areas of hinge sleeves are relatively small, so that the requirement for the strength of hinge sleeve is reduced, the weight of press body is greatly decreased, the requirement for the strength of materials is also lowered, and thus the manufacturing cost of equipment is reduced.

Finally it must be mentioned as follows: Said embodiments are merely used to describe rather than limit the present invention; Although detail description of the present invention is provided with reference to preferred embodiments, the common technologists in this field shall understand that all the modifications or equitable substitutions to the present invention without deviation from the spirit and range of present invention shall be covered by the Claims of present invention.

The invention claimed is:

1. An outer frame for a cubic hinge press, said outer frame enclosing an accommodation space, supporting planes used for supporting and fixing back cover plates of a hinge sleeve cylinder being set around inner walls of the outer frame and on inner walls of upper and lower surfaces of the outer frame, and a window for assembly, disassembly and maintenance of a press being correspondingly set between two adjacent supporting planes on the outer frame;

wherein said outer frame is formed by connecting a surrounding conjoined support and upper and lower butterfly supports, the surrounding conjoined support being designed as a framed structure, the supporting planes used for supporting and fixing the back cover plates of the hinge sleeve cylinder being set on inner walls of its surrounding frames, and hinge ears being set on the upper and lower parts around the conjoined support;

wherein the supporting planes used for supporting and fixing the back cover plates of the hinge sleeve cylinder are set on the inner walls of upper and lower butterfly supports, butterfly hinge ears being correspondingly set on the upper and lower butterfly supports and surrounding conjoined support; and wherein the surrounding conjoined support and the upper and lower butterfly supports are fixed by mutually matching hinge ears connected through pins, the window for the assembly, disassembly and maintenance of the press being formed between two adjacent connecting hinge ears.

2. An outer frame for a cubic hinge press, said outer frame enclosing an accommodation space, supporting planes used for supporting and fixing back cover plates of a hinge sleeve cylinder being set around inner walls of the outer frame and on inner walls of upper and lower surfaces of the outer frame, and a window for assembly, disassembly and maintenance of a press being correspondingly set between two adjacent supporting planes on the outer frame;
   wherein said outer frame is formed by connecting a basket type frame and a frame cover;
   wherein the supporting planes used for supporting and fixing the back cover plates of the hinge sleeve cylinder are set on a bottom inner surface and surrounding inner walls of the basket type frame;
   wherein the supporting planes used for supporting and fixing the hinge sleeve cylinder are set on an inner surface of the frame cover connected on an upside of a basket frame, the corresponding hinge ears being respectively set around an opening part of the basket type frame and set around the frame cover; and
   wherein the basket type frame and the frame cover are fixed by mutually matching hinge ears connected through pins, the window for the assembly, disassembly and maintenance of the press being set between two adjacent supporting planes on the outer frame.

3. The outer frame for the cubic hinge press of claim 2:
   wherein said pins are radial movement positioning pins, which are mainly composed of halves type position sleeves and taper core shafts; and
   wherein an inner wall of a halves type position sleeve present taper form, its outer wall presents cylindrical form, and its end surface has radial boss, a clearance being reserved between two halves of the position sleeve, a taper core shaft adapted to its inner wall being sleeved in the position sleeve, and a stud section being set at atop of the core shaft and fixed in cooperation with a rotation nut.

4. A cubic hinge press with an outer frame composed of the outer frame and a press body which is installed in the outer frame and is formed by connecting six hinge sleeve piston components;
   wherein back cover plates of a hinge sleeve cylinder are installed in supporting planes which set around inner walls of the outer frame and on inner walls of upper and lower surfaces of the frame;
   wherein a window for the assembly, disassembly and maintenance of the press is correspondingly set between two adjacent supporting planes on said outer frame;
   wherein said outer frame is formed by connecting a surrounding conjoined support and upper and lower butterfly supports;
   wherein the surrounding conjoined support is designed as a framed structure, the supporting planes used for supporting and fixing the back cover plates of the hinge sleeve cylinder being set around inner walls of the surrounding conjoined support, and hinge ears being set on lower and upper parts around it; and
   wherein the supporting planes used for supporting and fixing the back cover plates of the hinge sleeve cylinder are set on inner surfaces of the upper and lower butterfly supports, butterfly hinge ears being on its four sides, and the surrounding conjoined support and the upper and lower butterfly supports being fixed by coordinated hinge ears connected through pins.

5. A cubic hinge press with an outer frame composed of the outer frame and a press body which is installed in the outer frame and is formed by connecting six hinge sleeve piston components;
   wherein back cover plates of a hinge sleeve cylinder are installed in supporting planes which set around inner walls of the outer frame and on inner walls of upper and lower surfaces of the frame;
   wherein a window for the assembly, disassembly and maintenance of the press is correspondingly set between two adjacent supporting planes on said outer frame;
   wherein said outer frame is formed by connecting a basket type frame and a frame cover;
   wherein the supporting planes used for supporting and fixing the back cover plates of the hinge sleeve cylinder are set on an inner bottom surface and surrounding inner walls of four sides of the basket type frame;
   wherein the supporting planes used for supporting and fixing the hinge sleeve cylinder are set on the inner surface of the frame cover connected on an upside of the basket frame, corresponding hinge ears being respectively set around an opening part of the basket type frame and set around the frame cover; and
   wherein the basket type frame and the frame cover are fixed by coordinated hinge ears connected through pins, a window for the assemble, disassemble and maintenance of a press being set between two adjacent supporting planes on the outer frame.

6. The cubic hinge press with the outer frame of claim 5:
   wherein said pins are radial movement positioning pins, which are mainly composed of halves type position sleeves and taper core shafts; and
   wherein an inner wall of a halves type position sleeve present taper form, its outer wall presents cylindrical form, and its end surface has radial boss, a clearance being reserved between two halves of the position sleeve, a taper core shaft adapted to its inner wall being sleeved in the position sleeve, and a stud section being set at a top of the core shaft and fixed in cooperation with a rotation nut.

7. The outer frame for the cubic hinge press of claim 1:
   wherein said pins are radial movement positioning pins, which are mainly composed of halves type position sleeves and taper core shafts; and
   wherein an inner wall of a halves type position sleeve present taper form, its outer wall presents cylindrical form, and its end surface has radial boss, a clearance being reserved between two halves of the position sleeve, a taper core shaft adapted to its inner wall being sleeved in the position sleeve, and a stud section being set at a top of the core shaft and fixed in cooperation with a rotation nut.

8. The cubic hinge press with the outer frame of claim 4:
   wherein said pins are radial movement positioning pins, which are mainly composed of halves type position sleeves and taper core shafts; and
   wherein an inner wall of a halves type position sleeve present taper form, its outer wall presents cylindrical form, and its end surface has radial boss, a clearance being reserved between two halves of the position sleeve, a taper core shaft adapted to its inner wall being sleeved in the position sleeve, and a stud section being set at a top of the core shaft and fixed in cooperation with a rotation nut.

* * * * *